US007130583B2

(12) United States Patent
Skorpik (10) Patent No.: US 7,130,583 B2
(45) Date of Patent: Oct. 31, 2006

(54) WIRELESS COMMUNICATION DEVICES AND MOVEMENT MONITORING METHODS (75) Inventor: James R. Skorpik, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 294 days.

(21) Appl. No.: 10/439,149

(22) Filed: May 14, 2003

(65) Prior Publication Data
US 2004/0229613 A1 Nov. 18, 2004

(51) Int. Cl.
H04B 7/00 (2006.01)
(52) U.S. Cl. ............... 455/41.2; 455/41.3; 455/574; 455/575.1; 455/343.2; 455/343.4
(58) Field of Classification Search ........... 455/41.2, 455/41.3, 574, 575.1, 343.2, 343.4
See application file for complete search history.

(56) References Cited

U.S. PATENT DOCUMENTS

| 3,934,156 | A | * | 1/1976 | Galemmo et al. ......... 307/117 |
| 5,300,875 | A |   | 4/1994 | Tuttle |
| 5,862,803 | A | * | 1/1999 | Besson et al. ............. 600/508 |
| 6,049,280 | A | * | 4/2000 | Andersson ............... 340/573.3 |
| 6,238,338 | B1 | * | 5/2001 | DeLuca et al. ............. 600/300 |
| 6,441,747 | B1 | * | 8/2002 | Khair et al. ............. 340/870.16 |
| 6,480,699 | B1 | * | 11/2002 | Lovoi ....................... 455/41.2 |
| 6,484,030 | B1 |   | 11/2002 | Breed |
| 6,501,807 | B1 | * | 12/2002 | Chieu et al. ................ 375/329 |
| 6,624,752 | B1 | * | 9/2003 | Klitsgaard et al. ....... 340/572.1 |
| 2001/0001758 | A1 | * | 5/2001 | Greeff et al. ................. 455/41 |
| 2003/0007473 | A1 | * | 1/2003 | Strong et al. ............... 370/338 |
| 2003/0014660 | A1 | * | 1/2003 | Verplaetse et al. ......... 713/200 |
| 2003/0163287 | A1 | * | 8/2003 | Vock et al. ................. 702/187 |
| 2004/0056091 | A1 | * | 3/2004 | Overhultz et al. .......... 235/382 |
| 2004/0077383 | A1 | * | 4/2004 | Lappetelainen et al. .... 455/574 |
| 2004/0140962 | A1 | * | 7/2004 | Wang et al. ................ 345/179 |
| 2004/0203361 | A1 | * | 10/2004 | Belcher et al. ............ 455/41.2 |
| 2005/0030160 | A1 | * | 2/2005 | Goren et al. .............. 340/10.5 |

* cited by examiner

Primary Examiner—Jean Gelin
Assistant Examiner—Huy Phan
(74) Attorney, Agent, or Firm—Wells St. John, P.S.

(57) ABSTRACT

Wireless communication devices and movement monitoring methods are described. In one aspect, a wireless communication device includes a housing, wireless communication circuitry coupled with the housing and configured to communicate wireless signals, movement circuitry coupled with the housing and configured to provide movement data regarding movement sensed by the movement circuitry, and event processing circuitry coupled with the housing and the movement circuitry, wherein the event processing circuitry is configured to process the movement data, and wherein at least a portion of the event processing circuitry is configured to operate in a first operational state having a different power consumption rate compared with a second operational state.

36 Claims, 3 Drawing Sheets

WIRELESS COMMUNICATION DEVICES AND MOVEMENT MONITORING METHODS

STATEMENT OF GOVERNMENT RIGHTS

This invention was made with Government support under contract DE-AC0676RLO 1830 awarded by the U.S. Department of Energy. The Government has certain rights in this invention.

TECHNICAL FIELD

This invention relates to wireless communication devices and movement monitoring methods.

BACKGROUND OF THE INVENTION

Remote wireless communications may be implemented using radio frequency (RF) technology. Exemplary applications utilizing RF technology include identification applications including, for example, locating, identifying, and tracking of objects. Radio frequency identification device (RFID) systems may be utilized to facilitate identification operations. For example, one device may be arranged to output and receive radio frequency communications and one or more remotely located device may be configured to communicate with the one device using radio frequency communications. The remotely located device(s) may be individually referred to as a tag, while the other device may be referred to as a reader or an interrogator. Some advantages of radio frequency communications of exemplary radio frequency identification device systems include an ability to communicate without contact or line-of-sight, at relatively fast speeds, and with robust communication channels.

Some radio frequency identification devices comprise internal batteries to implement active communications. Other devices may be implemented in passive arrangements wherein electrical energy is generated internally responsive to received energy, such as radio frequency illumination from an interrogator. Other configurations may utilize internal battery power with passive communications circuitry.

Radio frequency identification devices may be associated with an object or article, for example in inventory, and used to communicate identification information of the object or article to the interrogator. In addition, some radio frequency identification devices may be arranged to communicate additional information regarding the object or article. Exemplary aspects described herein provide apparatus and methods for implementing monitoring operations, and in some embodiments, for communicating the monitored information.

BRIEF DESCRIPTION OF THE DRAWINGS

Preferred embodiments of the invention are described below with reference to the following accompanying drawings.

FIG. 4 is a schematic diagram of an exemplary arrangement of some of the components of the device shown in FIG. 2.

DETAILED DESCRIPTION OF THE PREFERRED EMBODIMENTS

According to one aspect of the invention, a wireless communication device comprises a housing, wireless communication circuitry coupled with the housing and configured to communicate wireless signals, movement circuitry coupled with the housing and configured to provide movement data regarding movement sensed by the movement circuitry, and event processing circuitry coupled with the housing and the movement circuitry, wherein the event processing circuitry is configured to process the movement data, and wherein at least a portion of the event processing circuitry is configured to operate in a first operational state having a different power consumption rate compared with a second operational state.

According to another aspect of the invention, a wireless communication device comprises means for communicating wireless communication signals, means for monitoring movement of the wireless communication device, means for operating the wireless communication device in a plurality of different operational states having different rates of power consumption during the monitoring, and wherein the means for operating comprises means for operating in one of the operational states during an absence of movement of the wireless communication device, and a second operational state in a presence of movement of the wireless communication device, the second operational state having an increased rate of power consumption compared with the first operational state.

According to an additional aspect of the invention, a movement monitoring method comprises providing a wireless communication device, communicating wireless communication signals with respect to an external device using the wireless communication device, monitoring movement of the wireless communication device using internal electrical circuitry of the wireless communication device, providing movement data regarding the movement of the wireless communication device, operating the wireless communication device in a plurality of different operational states having different rates of energy consumption corresponding to a presence and an absence of movement of the wireless communication device.

According to yet another aspect of the invention, a movement monitoring method comprises providing a plurality of wireless communication devices and an interrogator, monitoring movement of the wireless communication devices using respective individual ones of the wireless communication device, the monitoring comprising operating the wireless communication devices in a first operational state in the absence of a movement event and having reduced power consumption rate and a second operational state in the presence of a movement event and having an increased power consumption rate compared with the power consumption rate of the first operational state, and communicating movement data obtained by the monitoring from the wireless communication devices to the interrogator.

Figure 1:
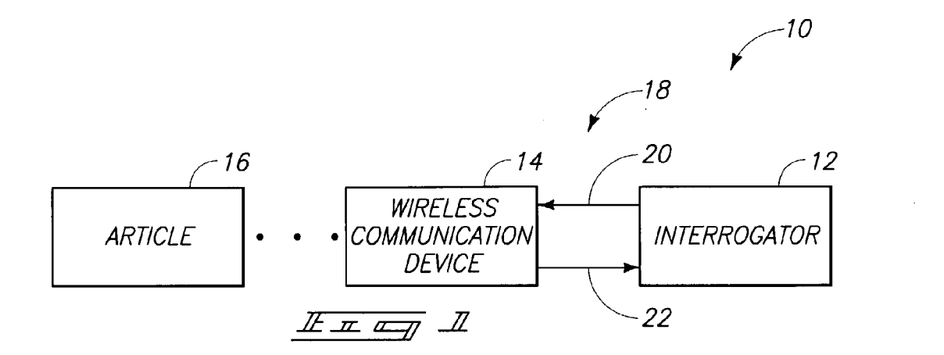
FIG. 1 is a functional block diagram of an exemplary wireless communication system according to one embodiment.

Referring to FIG. 1, an exemplary wireless communication system 10 is depicted. The exemplary system 10 includes an interrogator 12 and one or more wireless communication device 14 which may also be referred to as a wireless identification device in embodiments configured to implement identification operations. Only one device 14 is shown in the exemplary arrangement of FIG. 1. In other applications, a plurality of devices 14 may be utilized for communications and monitoring operations described herein. Individual devices 14 may be associated with a respective article 16, such as objects in an inventory, during transportation, or any other moment in time wherein the objects may be subjected to movement including shock events. In one aspect, individual devices 14 are physically coupled with article 16 and are configured to monitor movement of article 16 and provide information responsive to the monitoring as described below.

Interrogator 12 and wireless communication device 14 are arranged to implement wireless communications 18 in the depicted exemplary embodiment. Possible wireless communications 18 include first wireless communication signals 20 communicated from interrogator 12 and second wireless communication signals 22 communicated from the one or more wireless communication device 14.

System 10 is provided to illustrate exemplary structural and method aspects of the present invention. In one possible implementation mentioned above, wireless communication devices 14 may be configured to provide identification of the respective devices 14 and respective associated article(s) 16. For example, system 10 may be implemented as a radio frequency identification device (RFID) communications system. In one exemplary arrangement, interrogator 12 may be implemented as a reader, and wireless communication devices 14 may be implemented as transponders, such as RFID tags.

In one configuration, first wireless communication signals 20 may be referred to as forward link wireless signals or interrogation signals and second wireless communication signals 22 may be referred to as return link wireless signals. The return link wireless signals 22 may be communicated responsive to forward link wireless signals 20 to implement transponder operations in one embodiment. In an exemplary identification application, wireless communication device 14 may communicate a unique identifier which identifies device 14 and/or one or more respective article 16 associated therewith. Exemplary wireless communications 18 include electromagnetic energy or signals, such as radio frequency signals. Alternatively, wireless communications 16 may comprise infrared signals, acoustic signals, or any other appropriate signals capable of being communicated between devices 12, 14.

Figure 2:
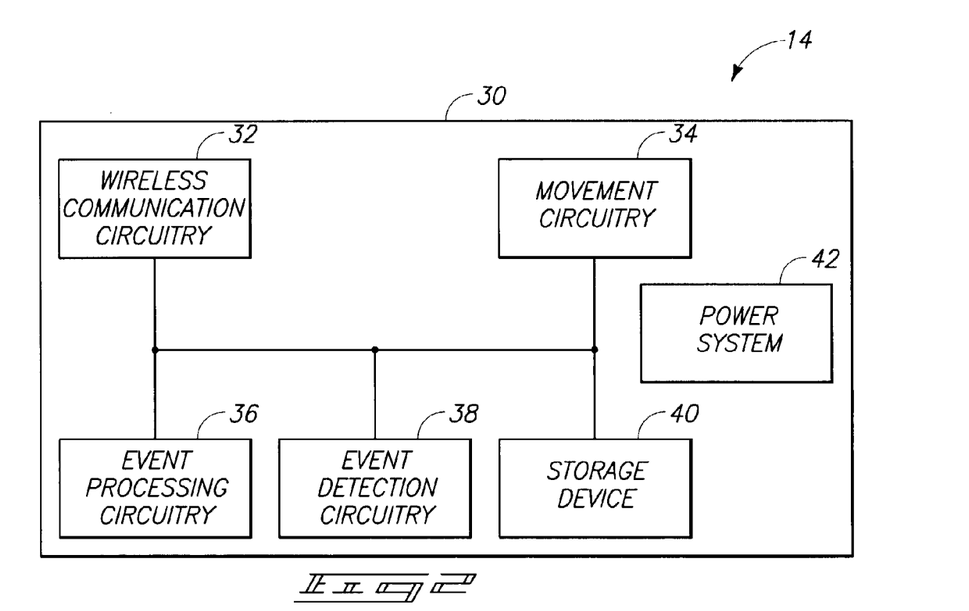
FIG. 2 is a functional block diagram of an exemplary wireless communication device according to one embodiment.

Referring to FIG. 2, an exemplary wireless communication device 14 comprises a housing 30, wireless communication circuitry 32, movement circuitry 34, event processing circuitry 36, event detection circuitry 38, a storage device 40, and a power system 42. Other embodiments are possible including more, less, and alternative components.

Housing 30 couples individual components of device 14 in one example. Housing 30 may comprise an appropriate protective structure to house and protect internal components and to provide coupling to article 16 in one embodiment.

Wireless communication circuitry 32 may be configured to implement active communications (e.g., battery powered transmissions) or passive communications (e.g., backscatter communications wherein received radio frequency energy is modulated). Wireless communication circuitry 32 may comprise appropriate transmit and receive antennae, modulation circuitry and other circuitry to implement wireless communications. In an RFID embodiment, wireless communication circuitry 32 comprises RFID communication circuitry configured to implement RFID transponder and identifying communications with interrogator 12.

Wireless communication device 14 is configured to monitor movement of device 14 and/or article 16 in an exemplary configuration described below. Wireless communication circuitry 32 may output wireless communication signals comprising movement data obtained by device 14. In one arrangement, wireless communication device 14 is configured to output the movement data responsive to inquiry from interrogator 12. Wireless communication device 14 may output an identifier which identifies device 14 and/or article 16.

Movement circuitry 34 is configured to provide movement information or data regarding movement sensed by movement circuitry 34. Accordingly, movement circuitry 34 is configured in one embodiment to provide movement data regarding movement of device 14. If device 14 is associated with an article 16 (e.g., physically coupled with article 16), movement circuitry 34 is configured to provide movement data regarding article 16 as well.

In one embodiment, movement circuitry 34 is configured to provide movement data regarding shock events experienced by device 14, and perhaps one or more article 16 (e.g., an article 16 associated with device 14 is dropped). Movement circuitry 34 may be implemented as an accelerometer. An accelerometer may be configured to provide shock data corresponding to forces detected on one or more axes of movement (e.g., x, y, z axes). The accelerometer may be implemented as a MEMs device such as a ACH04-08-05 available from Measurement Specialties, Inc. Other configurations of movement circuitry 34 are possible.

Event processing circuitry 36 is configured to process movement data provided by movement circuitry 34. For example, event processing circuitry 36 processes movement data for one or more shock event sensed by movement circuitry 34. Exemplary processing performed by event processing circuitry 36 comprises filtering the output of movement circuitry 34, amplifying the output, digitizing the output, and/or manipulating the output into different formats or otherwise manipulating the output for convenient, meaningful presentation (e.g., graphing). Additional exemplary details regarding processing are described below with respect to FIG. 3. Other or alternate processing may be performed in other embodiments.

Event detection circuitry 38 is configured to detect and signal the presence of a movement event experienced by movement circuitry 34. In one embodiment, event detection circuitry 38 compares output of movement circuitry 34 with one or more threshold to monitor movement events. Event detection circuitry 38 may output an event detection signal to event processing circuitry 36 responsive to a triggering of a threshold by a movement event. In one embodiment, event detection circuitry 38 may detect positive and negative (e.g., +g and −g) forces along one or more axes of movement.

In one embodiment, event processing circuitry 36 is configured to change a mode of operation responsive to the detection of a movement event. In one embodiment, device 14 including at least a portion of event processing circuitry 36 are configured to operate in a plurality of operational modes. Exemplary operational modes may be referred to as a dormant operational state and an active operational state having different power consumption rates (e.g., the event processing circuitry 36 consumes less electrical energy during operation in the dormant operational state). For example, wireless communication device 14 may be implemented in a configuration wherein monitoring of movement is desired for lengthy periods of time (e.g., decades). Some arrangements of device 14 utilize internal electrical storage batteries for the supply of power. Accordingly, it is desired in one arrangement to conserve power consumption of device 14, particularly at moments of time wherein no movement of device 14 is occurring.

According to one operational scheme, the portion of the event processing circuitry 36 is configured to operate in the dormant operational state in the absence of movement events and to operate in the active operational state in the presence of sensed movement events. The signal from event detection circuitry 38 indicates the presence of a movement event in one configuration. In one embodiment, the detection signal changes operation of device 14 and the operation of event processing circuitry 36 from the dormant or reduced power consumption state to the active operational state having an increased power consumption rate when compared with the dormant operational state. Operation of the event processing circuitry 36 changes from the dormant operational state wherein substantially no processing of movement events occurs to the active operational state wherein processing of events is provided responsive to the detection of a movement event.

In one embodiment, movement circuitry 34 is configured to provide movement information corresponding to plural axes of movement (as mentioned above). In one embodiment, event detection circuitry 38 is configured to monitor movement in the plural axes to provide detection signals corresponding to movement events. In another embodiment, event detection circuitry 38 is configured to monitor for the presence of a movement event in less than all of the monitored axes of movement (e.g., only the y axis if such may be the most likely axis to sense a shock event) during operation of device 14 in the dormant operational state. Upon detection of a movement event, event detection circuitry 38 may activate event processing circuitry 36 to process movement data corresponding to an increased number of axes of movement (e.g., x, y, z) compared with operation in the dormant operational state. In another embodiment, the same number of axes are monitored for movement and processed.

Following operation in the active operational state, operation of device 14 returns to the dormant operational state in accordance with one operational scheme. Numerous criteria may be used to control the return of the operation of device 14 from the active operational state to the dormant operational state wherein less electrical energy is consumed. In one embodiment, the elapse of a predetermined period of time controls the return of the operational state to the dormant operational state. In another embodiment, the processing and/or storage of a predetermined number of data samples controls the operational state. In another embodiment, the magnitude of the event dropping below a threshold controls the return of the operational state to the dormant operational state.

Accordingly, device 14 may be arranged in one embodiment to consume minimal energy during the absence of movement events, and to consume an increased amount of energy during the presence of movement events, and to return to the dormant operational state following the termination of the movement event or the moment when sufficient data regarding the event has been processed.

Storage device 40 is configured to store electronic data and/or programming such as executable instructions (e.g., software and/or firmware), data, or other digital information and may include processor-usable media. In one embodiment, storage device 40 is configured to store movement data samples processed and provided during movement events. Movement data may be manipulated into different formats including a time and/or frequency domain (e.g., using FFT analysis), archived within storage device 40 (or other appropriate memory), and/or offloaded using wireless communication circuitry 32.

Processor-usable media includes any article of manufacture which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

Power system 42 is configured to supply operational electrical energy to components of wireless communication device 14. In one exemplary active embodiment, power system 42 comprises a battery (e.g., a low leakage current 3.6 Volt lithium battery). Accordingly, in one embodiment, power system 42 is configured to provide power originating from entirely within device 14. In an exemplary passive embodiment, power system 42 may comprise rectifying circuitry to convert varying energy (e.g., corresponding to received RF) to direct current energy and/or battery energy usable by internal components. Additional details regarding power system 42 are illustrated in FIG. 4.

Figure 3:
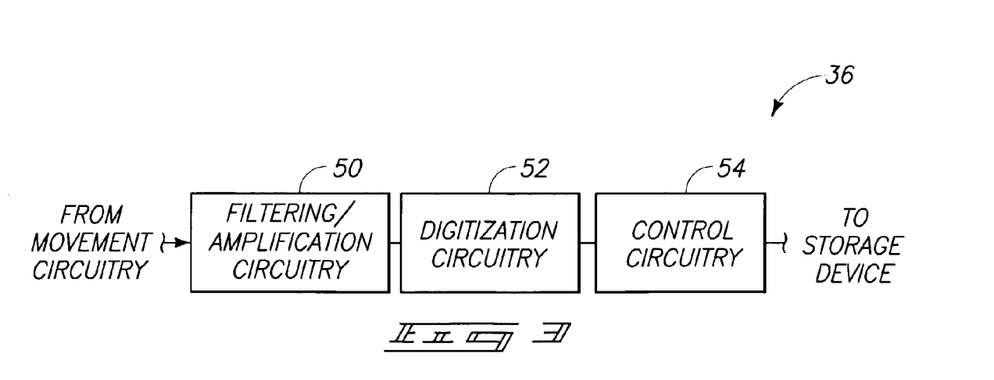
FIG. 3 is a functional block diagram of exemplary event processing circuitry of the wireless communication device in accordance with one embodiment.

Referring to FIG. 3 and FIG. 4, an exemplary embodiment of event processing circuitry 36 is shown. The exemplary event processing circuitry 36 comprises filtering and amplification circuitry 50, digitization circuitry 52, and control circuitry 54 individually configured to process movement data from movement circuitry 34. Circuitry 50, 52, 54 collectively or individually may comprise the portion of event processing circuitry 36 configured to change a rate of power consumption between the different operational states.

Movement circuitry 34 is configured to provide information regarding movement of device 14 and/or article 16. Movement circuitry 34 may comprise shock circuitry 60 configured to detect shock events as mentioned earlier. One exemplary shock circuit 60 comprises an accelerometer configured to monitor movement along one or more axes of movement (x, y, z) as mentioned previously.

Filtering and amplification circuitry 50 is configured to filter and amplify output signals from movement circuitry 34. In one embodiment, circuitry 50 may band pass filter the movement data from movement circuitry 34 to remove data below 10 Hz and above 550 Hz. Other ranges are possible in other embodiments. The gain of amplification circuitry 50 may also be adjusted corresponding to the application of device 14 and movement events to be monitored.

In one embodiment, a plurality of parallel devices (e.g., respective circuits 62 of FIG. 4) comprising circuitry 50 correspond to respective axes of movement being monitored. In one exemplary dormant operational state, one or more of the devices (e.g., circuit 62b of FIG. 4) may be powered down if not all of the movement of axes are being monitored to detect movement events. Upon detection of a movement event by the other of the devices (e.g., circuit 62a of FIG. 4), circuits 62b are powered and activated to provide data corresponding to the respective axes of movement. In other embodiments, all of the axes monitored for movement are also monitored for the detection of movement events, and accordingly, all of the devices of circuitry 50 are in an operable mode to provide movement data during the dormant operational mode of event processing circuitry 36 and device 14.

Digitization circuitry 52 is configured to receive the filtered and amplified signals from circuitry 50. Digitization circuitry 52 may comprise a plurality of parallel analog-to-digital converters (e.g., A/D converters 64 of FIG. 4) corresponding to the respective axes of movement in one embodiment. Digitization circuitry 52 digitizes received analog signals, and outputs digital signals corresponding to the received analog signals and indicative of the movement data provided by movement circuitry 34. Digitization circuitry 52 may operate in a plurality of operational modes corresponding to the operational mode of event processing circuitry 36 or device 14. In the dormant operational mode, digitization circuitry 52 may be in a low power consumption mode wherein the device is powered, but not in a state for processing of data. In the active operational mode, digitization circuitry 52 is configured to implement analog-to-digital conversion operations. A/D converters 64 may comprise ADS7822ECT converters available from Burr-Brown Corporation in one arrangement.

Control circuitry 54 may be utilized to control the operational state of digitization circuitry 52. In a dormant operational mode, microprocessor 66 of control circuitry 54 provides the A/D converters 64 a reduced power consumption mode. In the active operational mode, microprocessor 66 applies a control signal to provide the A/D converters 64 in the active operational mode to digitize the movement data. Microprocessor 66 may also utilize the control signal to synchronize the digitization operations of A/D converters 64 to provide simultaneous digitization of movement data of the different axes for appropriate vector analysis if plural axes of movement are monitored.

In one embodiment, control circuitry 54 may comprise circuitry configured to implement desired programming. For example, the control circuitry may be implemented as microprocessor 66 of FIG. 4 and/or other structure configured to execute executable instructions including, for example, software and/or firmware instructions. An exemplary microprocessor 66 comprises a MSP430F149IPM, available from Texas Instruments Inc. Other exemplary embodiments of control circuitry 54 include hardware logic, PGA, FPGA, ASIC, and/or other structures. These examples of control circuitry 54 are for illustration and other configurations are possible.

Control circuitry 54 is configured to control operations of device 14 (e.g., acquisition of movement data, control of device 14 in the different operational modes, processing of wireless communications, etc.). Control circuitry 54 is configured to monitor for the presence of a detection signal from event detection circuitry 38 signaling the presence of a detected movement event (e.g., monitoring the INT interrupt in microprocessor 66).

Event detection circuitry 38 is coupled with filtering/amplification circuitry 50 to detect the presence of a movement event. In the exemplary configuration of FIG. 4, event detection circuitry 38 includes a digital-to-analog converter 70, a plurality of comparators 72 and an OR gate 74. Digital-to-analog converter 70 is configured to receive a digital threshold from microprocessor 66 for use in comparison operations. In one embodiment, converter 70 comprises a LTC1662CMS8 available from Linear Technology Corporation. The digital threshold may be adjusted corresponding to the particular application of wireless communication device 14 and the events being monitored.

Comparators 72 receive output of filtering/amplifying circuit 62a and compare the output with the threshold from converter 70. Comparators 72 individually detect one of positive and negative events (e.g., +g and −g events) from circuit 62a in one embodiment. The output of comparators 72 is provided to OR gate 74 configured to assert the detection signal corresponding to a positive or negative event from circuit 62a triggering one of comparators 72. In the depicted example, only the y axis is monitored for the detection of a movement event in the dormant operational state although the x, y, z axes of movement are monitored during movement data acquisition operations in the active operational mode.

In another embodiment, an increased number of the axes of movement (x and/or z) may also be monitored to detect movement events and trigger device 14 to enter the active operational mode. In such an exemplary configuration, operational power is applied to respective filtering/amplification circuits of the axes being monitored during the dormant operational mode (e.g., circuits 62a may be provided for all three axes). Respective pairs of comparators 72 may be coupled with the additional axes being monitored and the output of the comparators may be provided to OR gate 74 to control the interrupt of microprocessor 66. Accordirigly, a detection signal may be generated from an event occurring on any of the axes. The latter described embodiment has the advantages of monitoring for the presence of movement events in additional axes with the associated additional consumption of an increased amount of power compared with monitoring only one or two axes of movement.

Responsive to the reception of the detection signal, control circuitry 54 may switch the operational mode of device 14 from the dormant operational state to the active operational state. In FIG. 4, control circuitry 54 may control power system 42 to apply operational power to appropriate devices for movement data acquisition operations. The exemplary power system 42 comprises a power source 80 and power control 82. Power source may comprise a battery as mentioned previously. Power control 82 is configured to selectively supply operational power to some of the components of device 14 corresponding to the operational mode of device 14. For example, the power bus +V provides operational power during dormant and active operational modes. The power bus +Vs is configured to provide operational power during operations of device 14 in the active operational mode and no operational power during the dormant operational mode. Control circuitry 54 can control the application of electrical power via the +V and +Vs buses using the +V and +Vs on/off control signals.

Portions of control circuitry 54 may be separately activated or deactivated corresponding to the operational mode of device 14. During active operational mode, additional portions of control circuitry 54 may be activated to provide movement data acquisition operations. For example, during the dormant operational mode, microprocessor 66 may disable circuitry corresponding to data digitization operations (e.g., internal circuitry associated with the illustrated exemplary I/O ports and Control port). During the indication of a movement event via the INT port, control circuitry 54 may activate the circuitry of the I/O ports and control port to implement movement data acquisition or other operations.

Movement data is acquired by microprocessor 66 from A/D converters 64 in the depicted exemplary configuration of FIG. 4. The acquired movement data samples may be stored within memory internal of microprocessor 66, stored within storage device 40, and/or communicated externally of device 14 using wireless communication circuitry 32. In one operational method, the device 14 stores movement data of movement events within storage device 14 at a first moment in time, subsequently receives an interrogation signal 20 from interrogator 12 at another moment in time, and operates to output wireless communication signals 22 comprising the stored movement data responsive to the received interrogation signal 20.

Figure 5:
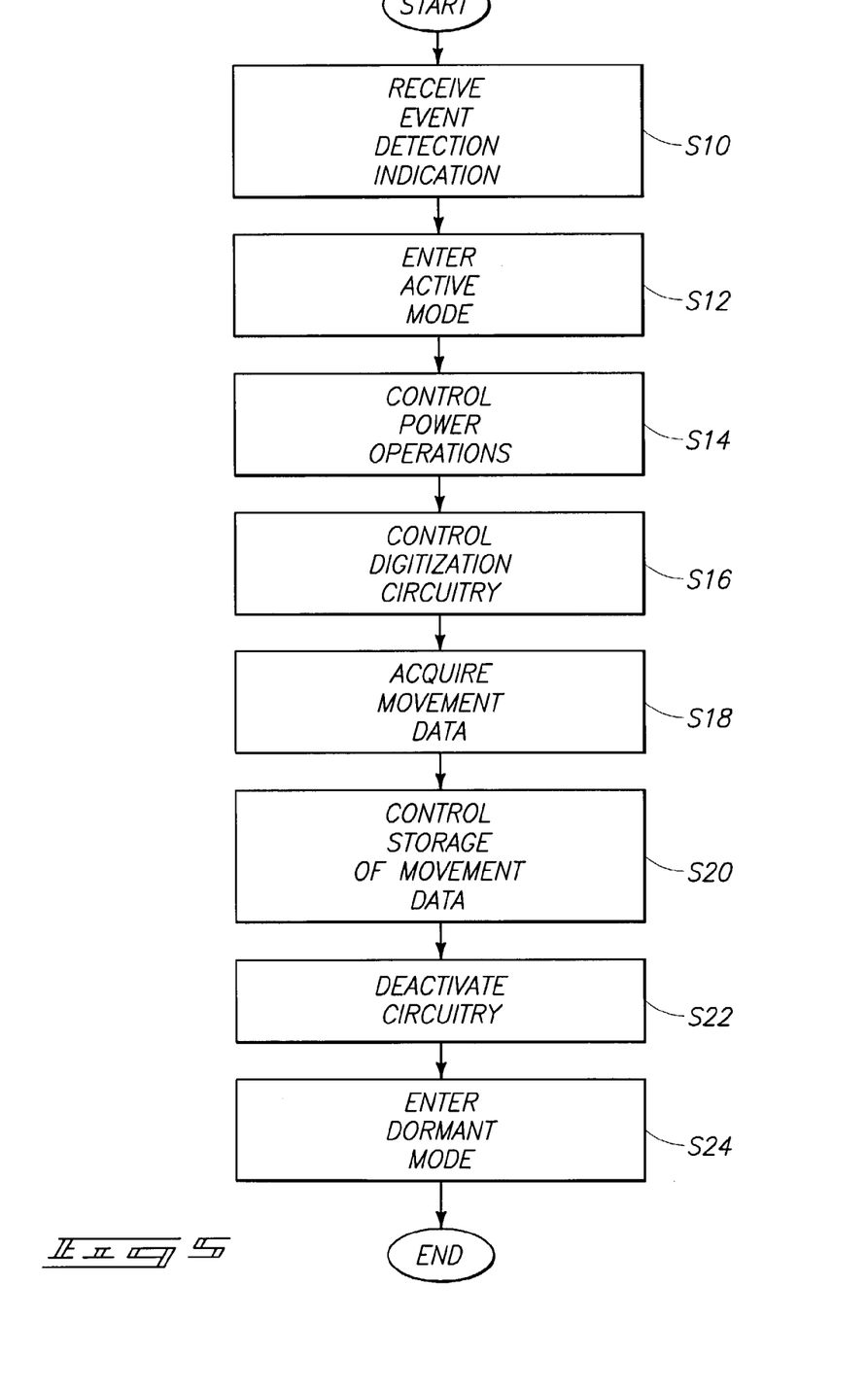
FIG. 5 is a flow chart of an exemplary methodology executable by the device shown in FIG. 2.

Referring to FIG. 5, an exemplary methodology executable by control circuitry 54 is illustrated corresponding to dormant and active operational modes. Other methods are possible including more, less or alternative steps.

At a step S10, the control circuitry operating in the dormant operational mode receives an event detection signal corresponding to a shock event.

At a step S12, the control circuitry may internally enter the active operational mode and power-up additional internal circuitry of microprocessor 66 for data acquisition.

At a step S14, the control circuitry may control the power system to power-up external components for operation in the active operational mode.

At a step S16, the control circuitry controls the digitization circuitry to enter the active operational mode and may synchronize the digitization circuitry with an appropriate control signal.

At a step S18, the control circuitry acquires movement data from the digitization circuitry and may perform any desired manipulation of the movement data (e.g., FFT processing).

At a step S20, the control circuitry controls the storage of the movement data.

At a step S22, the control circuitry may detect an appropriate stimulus to enter the dormant operational mode (e.g., detect a timeout event) and may control circuitry of device 14 to enter the dormant operational mode.

At a step S24, the control circuitry also powers down internal circuitry (e.g., of microprocessor 66) to enter the dormant operational mode.

Exemplary embodiments described herein provide wireless communication devices configured to monitor movement of the device and/or an associated article(s) and provide wireless identification operations of the device and/or article. In one embodiment, the device has different operational modes or states to minimize or reduce the consumption of electrical energy. During an exemplary dormant operational state for a single axis monitoring device 14, the power consumption is approximately 25 micro Amps. During operations in the active operational state, the power consumption is approximately 1.5 milliAmps. The device may monitor movement along one or more axes of movement and comprising shock events in but one implementation.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A wireless communication device comprising:
a housing;
wireless communication circuitry coupled with the housing and configured to communicate wireless signals;
movement circuitry coupled with the housing and configured to provide movement data regarding movement sensed by the movement circuitry;
event processing circuitry coupled with the housing and the movement circuitry, wherein the event processing circuitry is configured to process the movement data, and wherein at least a portion of the event processing circuitry is configured to operate in a first operational state having a different power consumption rate compared with a second operational state;
wherein the portion of the event processing circuitry comprises digitization circuitry coupled with the housing and the movement circuitry, and wherein the digitization circuitry is configured to receive analog signals generated within the movement circuitry, and to output digital signals corresponding to the analog signals; and
wherein the movement circuitry is configured to sense movement events along a plurality of axes of movement, and wherein the event processing circuitry is configured to monitor movement along less than all of the axes of movement during the first operational state, and to monitor movement along an increased number of axes compared with the first operational state during the second operational state.

2. The device of claim 1 wherein the movement circuitry is configured to provide the movement data regarding movement of the wireless communication device.

3. The device of claim 1 wherein the wireless communication device is associated with an article, and wherein the movement circuitry is configured to provide the movement data regarding movement of the article.

4. The device of claim 1 wherein the portion of the event processing circuitry consumes less power in the first operational state compared with the second operational state.

5. The device of claim 1 wherein the portion of the event processing circuitry is configured to operate in the first operational state in the absence of the movement event, and to operate in the second operational state in the presence of a sensed movement event.

6. The device of claim 1 wherein the portion of the event processing circuitry changes operation from the first operational state to the second operational state responsive to the occurrence of a sensed movement event.

7. The device of claim 1 further comprising a power source coupled with the housing and configured to provide power originating from entirely within the device.

8. The device of claim 1 further comprising a storage device coupled with the housing and configured to store information regarding the movement data.

9. The device of claim 1 wherein the wireless communication circuitry is configured to communicate wireless signals comprising an identifier of the wireless communication device.

10. The device of claim 1 wherein the wireless communication circuitry is configured to communicate wireless signals responsive to a received interrogation signal.

11. The device of claim 1 wherein the wireless communication circuitry is configured to communicate wireless signals comprising movement data.

12. The device of claim 1 wherein the first operational state comprises a dormant operational state wherein substantially no processing of the movement data is provided by the portion of the event processing circuitry and the second operational state comprises an active operational state wherein processing of the movement data by the event processing circuitry is provided by the portion of the event processing circuitry.

13. The device of claim 1 wherein the portion of the event processing circuitry comprises amplification circuitry coupled with the housing and the movement circuitry, and wherein the amplification circuitry is configured to amplify signals from the movement circuitry.

14. The device of claim 1 wherein the event processing circuitry comprises control circuitry, and wherein the portion of the event processing circuitry comprises the control circuitry.

15. The device of claim 1 wherein the event processing circuitry is configured to digitize signals from the movement circuitry and indicative of the movement data.

16. The device of claim 1 wherein the portion of the event processing circuitry is configured to operate in the second operational state or a predetermined period, and wherein the event processing circuitry returns to the first operational state after the predetermined period.

17. The device of claim 1 wherein the movement circuitry comprises an accelerometer.

18. The device of claim 1 wherein the communication circuitry comprises radio frequency identification device (RFID) communication circuitry configured to implement RFID communications with an interrogator.

19. The device of claim 1 further comprising event detection circuitry configured to receive the movement data and to control operation of the event processing circuitry between the first and second operational states responsive to the movement data.

20. The device of claim 19 wherein the event detection circuitry is configured to detect events within the movement data and to control the operation of the event processing circuitry responsive to the detection.

21. The device of claim 20 wherein the event detection circuitry is configured to detect positive and negative events along at least one axes of movement.

22. A wireless communication device comprising:
means for communicating wireless communication signals;
means for monitoring movement of the wireless communication device;
means for operating the wireless communication device in a plurality of different operational states having different rates of power consumption during the monitoring, and wherein the means for operating comprises means for operating the wireless communication device in a first of the operational states during an absence of movement of the wireless communication device, and operating the wireless communication device in a second of the operational states during a presence of movement of the wireless communication device, the second of the operational states having an increased rate of power consumption compared with the first of the operational states; and
wherein the means for monitoring movement comprises means for monitoring an increased number of axes of movement during the second of the operational states compared with the first of the operational states.

23. A movement monitoring method comprising:
providing a wireless communication device;
communicating wireless communication signals with respect to an external device using the wireless communication device;
monitoring movement of the wireless communication device using electrical circuitry of the wireless communication device;
providing movement data regarding the movement of the wireless communication device;
operating the wireless communication device in a plurality of different operational states having different rates of energy consumption corresponding to a presence and an absence of movement of the wireless communication device;
wherein the providing movement data comprises providing movement data of a plurality of different axes of movement during the presence of movement of the wireless communication device, and wherein the monitoring comprises monitering for the presence of the movement of the wireless communication device along less than the plurality of axes of movement during the absence of the movement of the wireless communication device; and
wherein the monitoring comprises monitoring the movement of the wireless communication device along different numbers of axes of movement during the operating of the wireless communication device in the different operational states.

24. The method of claim 23 wherein the monitoring comprises detecting a movement event of the wireless communication device, and changing the operational state of the wireless communication device responsive to the detecting.

25. The method of claim 23 further comprising:
performing substantially no processing of the movement data during an initial operational state; and
processing the movement data during a subsequent operational state responsive to the detecting.

26. The method of claim 25 wherein the processing comprises digitizing the movement data.

27. The method of claim 25 wherein the processing comprises amplifying the movement data.

28. The method of claim 23 further comprising storing the movement data internally of the wireless communication device.

29. The method of claim 23 wherein the communicating comprises outputting the wireless communication signals from the wireless communication device, the wireless communication signals comprising an identifier of the wireless communication device.

30. The method of claim 23 wherein the communicating comprises outputting the wireless communication signals from the wireless communication device, the wireless communication signals comprising the movement data.

31. The method of claim 23 wherein the monitoring movement comprises monitoring movement using an accelerometer.

32. The method of claim 23 wherein the communicating comprises receiving an interrogation signal, and outputting the wireless communication signals responsive to the receiving.

33. A movement monitoring method comprising:
providing a plurality of wireless communication devices and an interrogator;
monitoring movement of the wireless communication devices using respective individual ones of the wireless communication devices, the monitoring comprising operating the wireless communication devices in a first operational state in the absence of a movement event and having reduced power consumption rate and a second operational state in the presence of a movement event and having an increased power consumption rate compared with the power consumption rate of the first operational state;
communicating movement data obtained by the monitoring from the wireless communication devices to the interrogator; and wherein the monitoring, for an individual one of the wireless communication devices, comprises monitoring the movement of the respective one of the wireless communication devices along a different number of axes of movement corresponding to operation of the respective one of the wireless communication devices in different ones of the first and second operational states.

34. The method of claim 33 further comprising:
detecting a movement event during the monitoring of one of the wireless communication devices; and
changing the operational mode of the one wireless communication device responsive to the detecting.

35. The method of claim 33 further comprising processing the movement data using the wireless communication devices operating in the second operational state.

36. A wireless communication device comprising:
a housing;
wireless communication circuitry coupled with the housing and configured to communicate wireless signals;
movement circuitry coupled with the housing and configured to provide movement data regarding movement sensed by the movement circuitry;
event processing circuitry coupled with the housing and the movement circuitry, wherein the event processing circuitry is configured to process the movement data, and wherein at least a portion of the event processing circuitry is configured to operate in a first operational state having a different power consumption rate compared with a second operational state; and
wherein the movement circuitry is configured to sense movement events along a plurality of axes of movement, and wherein the event processing circuitry is configured to monitor movement along less than all of the axes of movement during the first operational state, and to monitor movement along an increased number of axes compared with the first operational state during the second operational state.

* * * * *

UNITED STATES PATENT AND TRADEMARK OFFICE
CERTIFICATE OF CORRECTION

PATENT NO. : 7,130,583 B2
APPLICATION NO. : 10/439149
DATED : October 31, 2006
INVENTOR(S) : Skorpik Page 1 of 1

It is certified that error appears in the above-identified patent and that said Letters Patent is hereby corrected as shown below:

Col. 8, line 25, please delete "Accordirigly," before "a detection" and insert --Accordingly,--

Col. 13, line 16, claim 35, please insert --only-- after "devices".

Signed and Sealed this

Seventeenth Day of June, 2008

JON W. DUDAS
*Director of the United States Patent and Trademark Office*